United States Patent
Wei et al.

(10) Patent No.: US 10,484,284 B2
(45) Date of Patent: Nov. 19, 2019

(54) REDUCING LOAD TO DOWNSTREAM SERVICES BY FILTERING REQUESTS

(71) Applicant: Microsoft Technology Licensing, LLC, Redmond, WA (US)

(72) Inventors: Yawen Wei, Sunnyvale, CA (US); Kaiyang Liu, Bellevue, WA (US); Jie Xiao, Sunnyvale, CA (US); Divye Khilnani, Sunnyvale, CA (US); Nihar Mehta, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 286 days.

(21) Appl. No.: 15/445,742

(22) Filed: Feb. 28, 2017

(65) Prior Publication Data
US 2018/0248801 A1   Aug. 30, 2018

(51) Int. Cl.
*H04L 12/801* (2013.01)
*H04L 29/08* (2006.01)
*H04L 12/26* (2006.01)

(52) U.S. Cl.
CPC .............. *H04L 47/12* (2013.01); *H04L 67/06* (2013.01); *H04L 43/0888* (2013.01)

(58) Field of Classification Search
CPC ...... H04L 47/12; H04L 67/06; H04L 43/0888
See application file for complete search history.

(56) References Cited

U.S. PATENT DOCUMENTS

| 7,483,893 | B2 * | 1/2009 | McVeigh | G06F 16/2471 |
| 2009/0313116 | A1 * | 12/2009 | Ashbaugh | G06F 17/211 |
| | | | | 705/14.47 |
| 2017/0005948 | A1 * | 1/2017 | Melander | H04L 41/5054 |
| 2017/0274893 | A1 * | 9/2017 | Huh | B60W 20/16 |
| 2017/0339638 | A1 * | 11/2017 | Szewczyk | H04W 52/0216 |
| 2018/0013810 | A1 * | 1/2018 | Gordon | H04N 21/23439 |

* cited by examiner

*Primary Examiner* — Arvin Eskandarnia
*Assistant Examiner* — Chhian (Amy) Ling
(74) *Attorney, Agent, or Firm* — Hickman Palermo Becker Bingham LLP

(57) ABSTRACT

A request filtration system that implements techniques to reduce load on a downstream service by efficiently filtering requests before they are processed by the downstream service. The request filtration system may be used by a request processing system to eliminate requests that satisfy any of one or more filters. For example, each filter specifies one or more attributes that may apply to one or more requests. If a request satisfies a filter, then the request is not considered by the downstream service or a content item does not need to be selected by the request processing system in response to the request.

20 Claims, 3 Drawing Sheets

REDUCING LOAD TO DOWNSTREAM SERVICES BY FILTERING REQUESTS

TECHNICAL FIELD

The present disclosure relates to server-side processing and, more specifically, processing information from a content item exchange and filtering requests from the content item exchange to reduce load. SUGGESTED GROUP ART UNIT: 2161; SUGGESTED CLASSIFICATION: 736/754.

RELATED CASES

This application is related to the following applications: (1) U.S. patent application Ser. No. 15/445,451, "Increasing Coverage of Responses for Requests through Selecting Multiple Native Content Items," filed on Feb. 28, 2017; (2) U.S. patent application Ser. No. 15/445,781, "Multi-Step Validation of Content Items based on Dynamic Publisher Requirements," filed on Feb. 28, 2017; (3) U.S. patent application Ser. No. 15/445,715, "Using Status Indicators in an Item Caching Environment," filed on Feb. 28, 2017; and (4) U.S. patent application Ser. No. 15/445,791, "Progress Tracking For Requests Made Through An Intermediary," filed on Feb. 28, 2017. These applications are hereby incorporated by reference in their entirety, for all purposes.

BACKGROUND

The availability of various content items on the Internet allows access to information in bulk. However, the sheer volume of content items available does not increase the usefulness of the content items. The information presented in the content items themselves should be relevant to each user. For example, a user interested in learning about current political developments may request content items. Content items with information on living and style may be irrelevant to the user, even though the same content item may be enjoyable for another user.

Other than matching relevant content items to users' requests, the volume of content items has also made it difficult to select and provide content items in a timely manner. For example, if a content item is not provided within certain time criteria, then a user may have a poor Website experience (e.g., slowly loading Web pages, incorrectly rendered Web pages) or other undesirable effects. Users may grow frustrated and choose to never view content items from that Website again, even if the content items are particularly relevant.

From the perspective of a request processing system, it is difficult to provide both timely and relevant content items to users. There are often many requests for content items from not only one user, but many users at a given time. The volume of requests or queries per second (QPS) may create a poor experience for users. For example, there may be one or more different services used by the request processing system to select relevant content items. Some of these services may have lower throughput or be able to handle a lower load than other services used by the request processing system, before reaching its maximum throughput. This may result in a bottleneck situation, slowing down the entire request processing system.

Therefore, it is desirable to have improved methods to match users with content items within specified time constraints.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
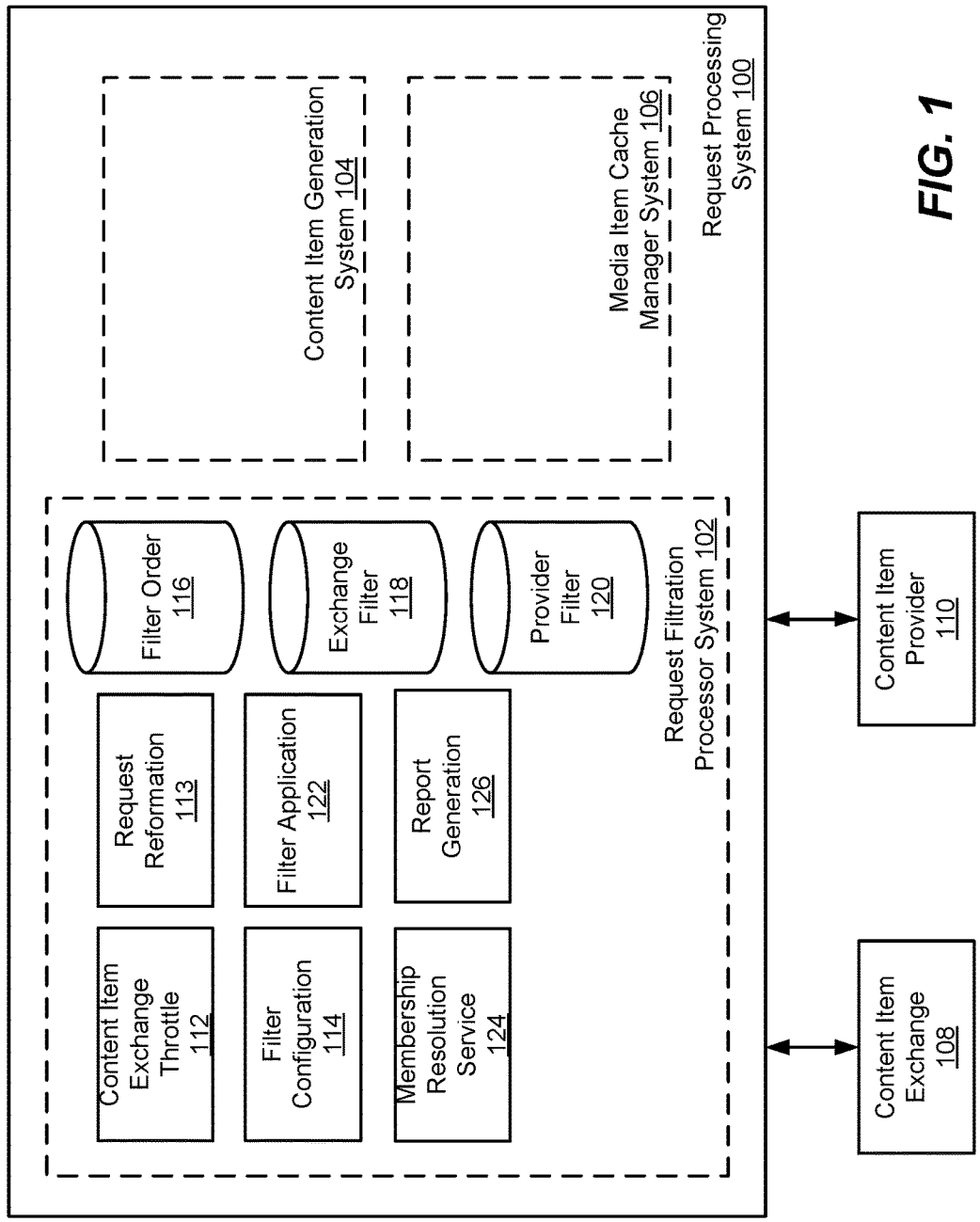
FIG. 1 illustrates a request processing system in which the techniques described may be practiced according to certain embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections below according to the following outline. The outline and headings used in the outline are provided merely for reference purposes. Features discussed following each heading do not limit the features as being required by a specific embodiment identified by each heading and do not limit the features as solely belonging to any specific embodiment identified by each heading.

| | | |
|---|---|---|
| 1.0 | GENERAL OVERVIEW | |
| | 1.1 | DOWNSTREAM SERVICE |
| | 1.2 | NATIVE CONTENT ITEMS |
| | 1.3 | MEDIA ITEMS |
| 2.0 | STRUCTURAL OVERVIEW | |
| | 2.1 | FILTER CATEGORIES |
| 3.0 | EXAMPLE METHOD FOR A REQUEST FILTRATION SYSTEM | |
| 4.0 | EXAMPLE OF APPLYING FILTERS IN A REQUEST FILTRATION SYSTEM | |
| 5.0 | EXAMPLE EMBODIMENT OF A REQUEST FILTRATION SYSTEM | |
| 6.0 | IMPLEMENTATION EXAMPLE - HARDWARE OVERVIEW | |

1.0 General Overview

A request filtration system is described herein which implements techniques to reduce load on one or more downstream services by filtering requests in a request processing system before they are processed by the downstream service. For example, requests from more than one content exchange may be received by the request processing system. Each content item exchange may have many requests and reducing the total number of requests from the content item exchanges before they are processed by the downstream service may be needed to maintain the responsiveness of the request processing system. Each content item exchange may only provide a limited amount of time for the request processing system to respond to a request. For example, a length of time to reply to a request may be 120 milliseconds, calculated from when a content item exchange transmits the request to when the content item exchange receives a response.

The request filtration system may be used by a request processing system to eliminate requests that satisfy one or more filters. For example, each filter specifies one or more attributes that may apply to one or more requests. If a request satisfies any of the filters, then the request is not considered by the downstream service or a content item does not need to be selected by the request processing system in response to the request.

1.1 Downstream Service

A downstream service may be any service where load should be reduced. The downstream service is used in the request processing system to properly select content items in response to requests. There may be any number of downstream services used by the request processing system. In an embodiment, a membership resolution service is a downstream service. The membership resolution service may be used to determine whether an entity associated with a request is a member of an online service. There may be many different reasons why load should be reduced to the membership resolution service. The membership resolution service may be a downstream service because service calls to the membership resolution service may be an expensive service call (e.g., high processing time, high resource requirements to execute) or an essential service used by system (e.g., the membership resolution service is not a dedicated service used only by the request filtration system). Information returned by the membership resolution service may include information on how to provide the most relevant content items to the user, based on information stored on the user in the online service.

Alternative embodiments of the request filtration system may include additional or substitute downstream services other than the membership resolution service. In an embodiment, the downstream service is a fraud detection service. The fraud detection service is used to determine whether one or more requests may be fraudulent. Fraudulent requests are requests made without intending to have a person view a content item selected for the fraudulent request. For example, a fraudulent request may originate from another computing device, without intending to present the content item to a person. By reducing fraudulent requests, this ensures that content items do not exhaust a resource amount associated with the content item for illegitimate purposes.

1.2 Native Content Items

The following is a sample use case of the media item cache manager system used with requests for content items that are dynamically published on a Web page. Although the specification may employ examples using this sample embodiment discussed below, the principles as described herein are generally applicable to other types of systems where there are requests that need to be satisfied within (or regardless of) a particular time constraint.

In an embodiment, the request processing system may be used to respond to requests where content items are used as part of a dynamically published Web page. These content items may also be known as native content items, an example type of which is advertisements. Native content items are different than other content items since, instead of specifying the requirements for a single element to be displayed on a Web page, native content items include two or more media items that will be combined for display on a Web page. Each native content item may include different media item requirements (e.g., information specifying what media items with which types are needed and technical requirements for the media items). Further, requirements information may include targeting information (e.g., information specifying whether a content item should be returned) and, for media items used to generate the native content item, technical requirements each media item must comply with.

1.3 Media Items

Media items may include any piece of content that may be displayed on a computer screen. Some examples of different types of media items include text, graphic, or video. Media items may also include additional information that is not displayable on a computer screen. Some examples include addressing information (e.g., a universal resource locator), identifying information on a content item provider that provided the media item, or other pieces of information.

A single native content item may include one or more media items. Media items may be associated with one or more types. The type for a media item defines where, for a native content item, the media item may be used. Some examples of types include an icon image, a logo image, a main image, a title, a call-to-action (CTA), a sponsor, a description, or many other types. Different requests for native content items may require one or more of these types to be satisfied. For example, a native content item request may include a requirement for a logo image, a title, and a sponsor.

Some examples of media item requirements in addition to type include a limit on the dimensions for a graphic element (e.g., pixel count, resolution, height, length, width), a text element (e.g., character count, text length), or a video element (e.g., pixel count, resolution, height, length, width, video quality, playback time). For example, the request processing system may include two or more media items with the type of logo. This means that, for requests that require a logo to be included, the two or more media items may possibly satisfy the requirement. However, there may be size, color, theme, or other attributes where the two or more logos differ. Some logos may be wider, while other logos may be narrower. Based on the requirements included with the request, the proper logo may be selected. As another example, a request may require a length of 15 characters for a company name. If there is a media item that satisfies the length requirement (15 characters) and type requirement (is a company name), it may be selected as part of the response to the request.

Further, additional changes may be applied to a selected media item after its selection. For example, in addition to the length requirement, before the media item is displayed as part of a Web page, the font, color, media item size, or other attribute of the media item may be modified.

The flexibility of using different media items depending on a request allows the reuse of media items (e.g., when a media item is selected for use with two or more native content items) as well as allowing a Web page to maintain a consistent "look and feel" (e.g., making sure content items properly fit in a specified space). However, this means that native content items lack predefined requirements of what media items should be used. For example, there may be preferred requirements such as fonts, lengths, sizes and other attributes for media items used in native content items. TABLE 1 below includes, in an embodiment of the request processing system, technical requirements for different media item types.

TABLE 1

| Media Item Type (media item category) | Technical Requirements |
| --- | --- |
| Icon image (graphic) | 320 × 180 pixels, 128 × 128 pixels, 80 × 80 pixels |

TABLE 1-continued

| Media Item Type (media item category) | Technical Requirements |
|---|---|
| Logo image (graphic) | 128 × 128 pixels, 80 × 80 pixels, 48 × 48 pixels |
| Main image (graphic) | 1200 × 627 pixels, 1000 × 750 pixels, 600 × 314 pixels, 300 × 157 pixels |
| Title (text) | 25 characters, 20 characters |
| Call to action (text) | 25 characters, 15 characters |
| Sponsor (text) | 25 characters |
| Description (text) | 100 characters, 90 characters, 72 characters |
| Video | video duration (e.g., 15 seconds, 30 seconds, 1 minute, or other time); video bitrate; video aspect ratio; supported media file format (e.g., mp4, WebM, others) |

If a content provider includes media items that comply with these requirements, then the chances of the content provider being able to properly respond to requests will increase. Since these are merely suggestions, however, conforming to these requirements may still mean that the content provider may not satisfy all possible requirements.

In an embodiment, the request filtration system is used to increase the chances of a content item being successfully validated by filtering and reducing the number of requests that need to be considered by the request processing system, so that throughput of the request processing system is maintained when responding to requests.

2.0 Structural Overview

FIG. 1 illustrates a request processing system 100 in which one or more of techniques described herein may be practiced according to certain embodiments. The request processing system 100 is a computer-based system. The various components of the request processing system 100 are implemented at least partially by hardware at one or more computing devices, such as one or more hardware processors executing instructions stored in one or more memories for performing various functions described herein. For example, descriptions of various components (or modules) as described in this application may be interpreted as providing pseudocode, an informal high-level description of one or more computer structures. The descriptions of the components may be converted into software code, including code executable by an electronic processor. The request processing system 100 illustrates only one of many possible arrangements of components configured to perform the functionality described herein. Other arrangements may include fewer or different components, and the division of work between the components may vary depending on the arrangement.

The request processing system 100 includes three separate systems that may operate in tandem or separately in the request processing system 100 to select content items: a request filtration system 102, a content item generation system 104, and a media item cache manager system 106. Although these systems include components divided into separate systems, the systems may communicate with each other or use information generated by other systems, or components within each system may be rearranged differently than the arrangements shown in FIG. 1. Further, different embodiments of the request processing system 100 may include one, two, or all three of these systems, in different combinations, depending on specific needs of the request processing system 100.

The request filtration system 102 may be responsible for reducing load in the request processing system 100, by reducing the number of requests to which the request processing system 100 responds. For example, the request filtration system 102 implements techniques to reduce load on a downstream service by filtering requests before they are processed by the downstream service. The request filtration system 102 may be used by the request processing system 100 to eliminate requests that satisfy one or more filters. Each filter may specify one or more attributes that may apply to one or more requests. If a request satisfies any applicable filter, then the request is not considered by the downstream service or a content item does not need to be selected by the request processing system 100 in response to the request.

The content item generation system 104 is responsible for selecting and identifying content items to return in response to a request. For example, the content item generation system 104 may separate requirements included with a request into first and second sets of requirements. The first set of requirements may be used to identify which content items or content item campaigns may be suitable to respond to the request. The second set of requirements may be used to determine whether items associated with the selected content items or content item campaigns correspond to technical requirements associated with (e.g., specified in) the request. An example of a content item generation system 104 that may be used with the request processing system 100 is described in the related U.S. patent application titled "Multi-Step Validation of Content Items based on Native Content Item Requirements" and U.S. Patent Application titled "Increasing Coverage of Responses for Requests through Selecting Multiple Native Content Items," as identified above in the Related Cases section of this application.

The media item cache manager system 106 is responsible for efficiently using cache memory to respond to requests received by a request processing system. The cache memory may include information on media items along with a status indicator for each of the media items, indicating different status information. Some examples of possible status indicators include valid, invalid, or in-progress indicators. An example of a media item cache manager system 106 that may be used with the request processing system 100 is described in the related U.S. Patent Application titled "Using Status Indicators in an Item Caching Environment," as identified above in the Related Cases section of this application.

A content item exchange 108 represents an entity that supplies requests of content items to the request processing system 100. There may be one or more content item exchanges that provide requests to the request processing system 100 that are not shown in FIG. 1. Each content item exchange may provide, to the request processing system 100, requests for one or more different media item types. For example, the content item exchange 108 may be a real-time bidding (RTB) content item exchange. The RTB content item exchange allows different parties to bid for impressions on one or more Web pages. A winner of a bid obtains the right to include the winner's content item on the one or more Web pages. The winner of the bid may be any party that offers that highest value to the content item exchange 108, such as revenue, content item suitability, or other factors determined by the content item exchange 108. One content item exchange may provide requests for video, text, graphical, native video, native text, native graphical, or any combination of these media item types.

A content item provider 110 represents an entity that supplies content items that may be selected for display in response to a request. Different entities may be content item providers. Some examples of entities include organizations, advertisers, persons, companies, and many other types of entities. The content item provider 110 may provide various pieces of information to generate content items, such as media items that are put together to form a content item, or complete content items themselves. The content item provider 110 may provide one or more media items of different types. Some examples of types of media items include audio, image, text, or video. Media items may also be associated with different types that define where they may be used in a content item and different media item types may be used for each type. For example, for a logo field, an image media item may be required, while for a company name, a text media item may be required.

The request filtration system 102 includes various components used to filter requests received at the request processing system 100. A content item exchange throttle component 112 is responsible for ensuring that the request processing system 100 meets quality of service requirements for each content item exchange. For example, if a content item exchange is transmitting a number of requests to the request processing system 100 that exceed a threshold amount, then the content item exchange throttle component 112 may limit the number of requests (from the content item exchange) that the request processing system 100 may process.

A request reformation component 113 is responsible for reformatting request information from an exchange's format to a request filtration system 102 format. For example, while the information stored using the exchange's format may include all or mostly the same information stored in the request filtration system 102's format, the information may be rearranged, expressed differently, or include other changes. While each exchange's format may differ, the request filtration system 102 format will be consistent among requests from one or more exchanges. Further, the request filtration system 102 format may be optimized for use in the request processing system 100. For example, information important to determining whether one or more filters may apply to a request may be easily indexed by the components of the request filtration system 102. For example, the location of where specific pieces of information in a request formatted according to the request filtration system 102 format may be known by one or more components of the request filtration system 102.

A filter configuration component 114 is responsible for creating and updating information in a filter order data store 116, an exchange filter data store 118, and a provider filter data store 120. The filter order data store 116 stores information on which filters from the exchange filter data store 118 and the provider filter data store 120 to apply to requests, as well as an order to apply the filters.

The exchange filter data store 118 stores information on different content item exchange filters. For example, the filters may specify one or more exchange-specific attributes that, if satisfied by a request, indicates that the request does not need to be processed further by the request processing system 100. As another example, the filters may specify one or more global exchange attributes that, if satisfied by a request, indicates that the request does not need to be processed further by the request processing system 100.

The provider filter data store 120 stores information on different content item provider filters. For example, the filters may specify one or more provider-specific attributes that, if satisfied by a request, indicates that the request does not need to be processed further by the request processing system 100. As another example, the filters may specify one or more global provider attributes that, if satisfied by a request, indicates that the request does not need to be processed further by the request processing system 100.

A filter application component 122 is responsible for applying filters to a request. For example, the filter application component 122 is aware of which request is being processed, what attributes to detect from the request, and determining whether the attributes match one or more filters.

A membership resolution service 124 is responsible for determining whether an entity associated with a request is associated with a member of an online service. The online service may be a social network service, where members of the online service provide information about themselves to associate with their membership. Some examples of information that may be used to select content items associated with a membership may include a listing of friends, organizations or companies the member has associated with, one or more "likes" that the member has indicated while using the social network service, location information, and other information. The social network may also collect additional information on the members, based on other input by the member when using the social network (e.g., browsing profiles, browsing entity information, connections to other members, purchasing history).

There may be different methods used by the membership resolution service 124 to determine whether the entity is a member of the social network. For example, the membership resolution service may use IP address matching, browser identifier information, cookies, mobile device identifier, or many other techniques. As one example, mobile devices using the Google Android™ operating system may provide a GUID while mobile devices using Apple Inc.'s iOS may provide an IDFA to identify the mobile device.

A report generation component 126 is responsible for generating reports on the success or failure of filters being applied to requests. The report may provide information to diagnose the effectiveness of the filters as applied to a set of requests. For example, the report may generate information on how many requests satisfy each filter applied to requests. This information may be used to modify information using the filter configuration component 114 to add filters (e.g., if too many requests are passing the filters, an additional filter may be needed to remove more requests), remove filters (e.g., if a filter is ineffective at removing requests, it may be removed), or order the filters differently (e.g., move a filter up or down in an order configuration for the filters, based on how many requests the filter removes or a percentage of requests that the filter removes).

2.1 Filter Categories

In an embodiment, the request filtration system 102 includes filters with at least two categories: content item exchange filter type and a content item provider (or bidder) type. This may be further divided into filters that are global (e.g., applies to all requests) or specific (e.g., applies only to specific content item providers or content item exchanges). There may be one or more filters specified under each category. Each filter may specify one or more content item exchange-specific or content provider-specific attributes to consider when determining whether the filter is satisfied. For example, a content provider A may choose to include a filter that ignores requests from a content item exchange B, but another content provider C may not include that filter. Further, a content provider may specify different orders to apply content provider-specific filters. For example, a content provider A may choose to apply a filter B before a filter C, but another content provider D may choose to apply the filter C before the filter B.

Some examples of filters separated by filter categories that may be used by the request filtration system 102 are included in TABLE 2 below. TABLE 2 is not an exclusive or comprehensive listing of filters that may be included with the request filtration system 102, and is meant to merely be illustrative of some filters that may be used be the request filtration system 102.

TABLE 2

| Category | Examples of Filters |
| --- | --- |
| Global content item exchange | filter requests that do not originate from entities identified by a membership resolution service.<br>filter requests originating from certain type of computing device (e.g., mobile web, desktop web, mobile application).<br>filter requests from specific content item exchanges. For example, determine whether a particular exchange is a low quality exchange (e.g., many fraudulent request from the particular exchange, low conversion rate for requests originating from the particular exchange).<br>filter requests from a specific publisher that made the request to an exchange. |
| Content item exchange-specific | filter requests originating from certain type of computing device (e.g., mobile web, desktop web, mobile application).<br>filter requests from particular mobile applications (e.g., blacklisted applications).<br>filter requests originating from a particular exchange.<br>filter requests that do not originate from a particular exchange.<br>filter requests from a specific publisher that made the request to a specific exchange. |
| Global content provider | filter requests based on whether the request is for or not for a native content item.<br>filter requests originating from a particular exchange.<br>filter requests from a specific publisher that made the request from an exchange. |
| Content provider-specific | filter requests based on a type of content item (e.g., banner content item, video content item).<br>filter requests originating from a particular exchange.<br>filter requests based on whether the request is for or not for a native content item.<br>filter requests from a specific publisher that made the request from an exchange. |

In an embodiment, the request filtration system 102 may supplement features provided by exchanges or content item providers. For example, not all exchanges may support filtering of traffic on their end or may only support a subset of filters provided by the request filtration system 102. Some exchanges may support filtering by geolocation, some can support filtering by content category. For filters that are not specifically supported by a particular exchange, the request filtration system 102 may supplement the capabilities of the particular exchange, through the use of one or more content item exchange-specific filters.

Filters in the request filtration system 102 are not necessarily category specific. For example, a set of filters applied to the request may include a global content provider filter specifying not to process requests from exchange A and a content item exchange-specific filter specifies not to process requests from exchange B. This may result in the removal of requests from both exchanges A and B.

In an embodiment, the request filtration system 102 uses filters to achieve various resource allocation objectives of the request processing system 100. As one example, for a content provider that is not interested in users requesting content via a mobile device, an attribute included with a content provider-specific filter may be to check whether the request originated from a mobile device. More complicated resource allocation objectives may also be satisfied through use of the filters. For example, the request filtration system 102 may filter requests from a particular mobile application that is blacklisted from exchange A. As another example, the request filtration system 102 may filter requests from a particular publisher of a request made through exchange Y. Thus, there may not be any filters on requests from the particular publisher made through exchange X.

Figure 2:
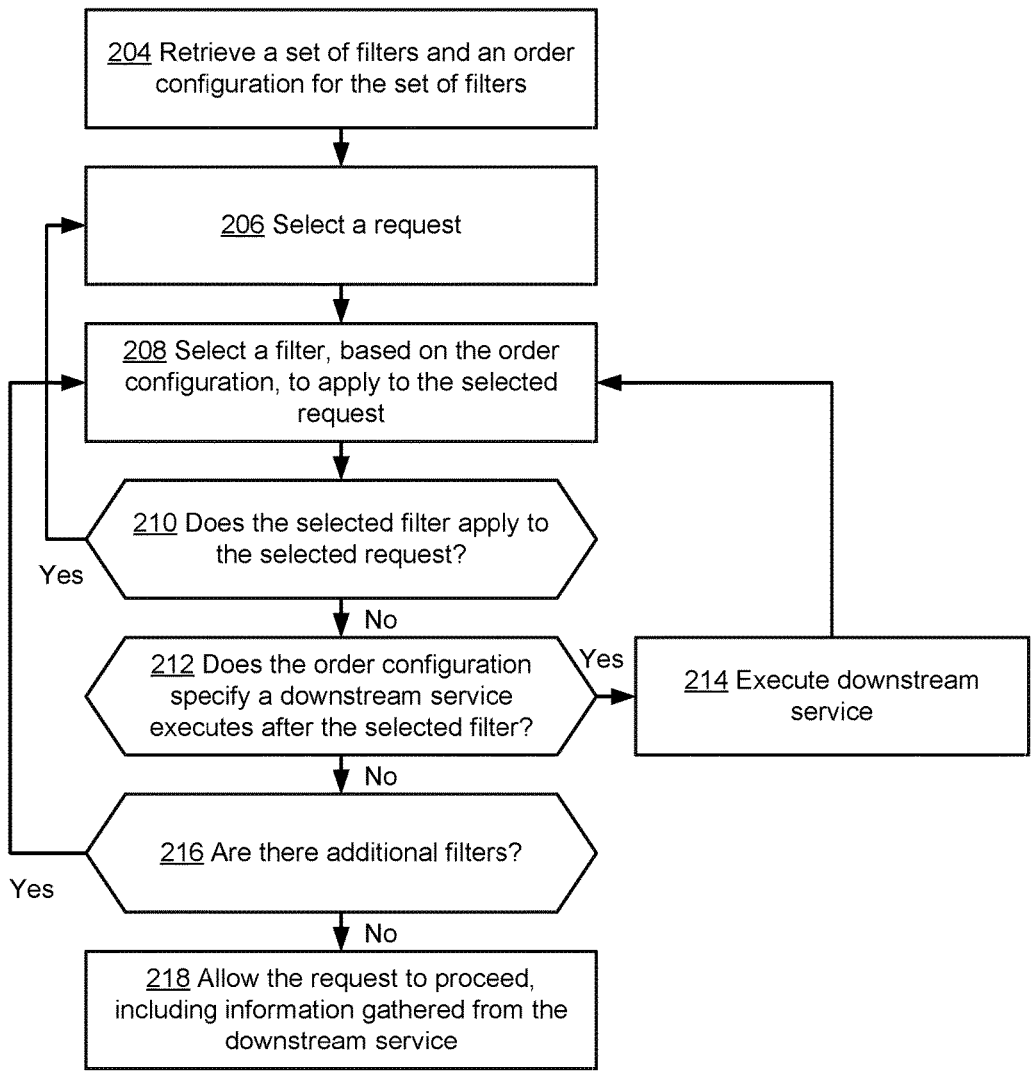
FIG. 2 is a flow that illustrates an example method for a request filtration system.

For purposes of illustrating a clear example, FIG. 2 is described herein in the context of FIG. 1, but the broad principles of FIG. 2 can be applied to other systems having configurations other than as shown in FIG. 1. Further, FIG. 2 illustrate an algorithm or plan that may be used as a basis for programming one or more of the components of FIG. 1 that relate to the functions that are illustrated in the diagram, using a programming development environment or programming language that is deemed suitable for the task. Thus, FIG. 2 is intended as an illustration at the functional level at which skilled persons, in the art to which this disclosure pertains, communicate with one another to describe and implement algorithms using programming. This diagram is not intended to illustrate every instruction, method object or sub step that would be needed to program every aspect of a working program, but is provided at the high, functional level of illustration that is normally used at the high level of skill in this art to communicate the basis of developing working programs.

3.0 Example Method for a Request Filtration System

FIG. 2 is a flow 200 that illustrates an example method for a request filtration system 102.

In step 204, the request filtration system 102 retrieves a set of filters and an order configuration for the set of filters. For example, the set of filters may be retrieved from a configuration file when the request filtration system 102 begins to execute or when a command to update the set of filters or the order configuration is received.

In an embodiment, the configuration file may be updated as needed and the request filtration system 102 operates uninterrupted even when the configuration file is updated. For example, if through machine learning techniques (e.g., request optimization algorithm) or a human operator determines that either the order of filters or the effectiveness of a filter may improve overall performance in the request filtration system 102, the configuration file may be updated and the updated information applied to requests on-the-fly. The request filtration system 102 does not need to be restarted or reset, in order to account for changes in the configuration file.

In step 206, the request filtration system 102 selects a request. For example, the request filtration system 102 may receive multiple requests for content items and these requests are analyzed one at a time or in parallel with each other. The requests may originate from one or more content item exchanges may be made by one or more publishers. The requests may include a variety of information, such as information on targeting information on entities that made the requests, where selected content items may appear, or technical information on the requirements needed to satisfy the requests.

In step 208, the request filtration system 102 selects a filter, based on the order configuration, to apply to the selected request. For example, the order configuration may specify one or more filters to apply in an order. Once a filter has been applied, the next filter specified in the order configuration is selected.

In step 210, the request filtration system 102 determines whether the selected filter applies to the selected request. If the selected filter applies, then the request filtration system 102 returns to step 206 to select another request, if any. In this scenario, the request processing system 100 will not respond to the request (to which the selected filter applies) with any content item. For example, the request processing system 100 may not respond at all or may inform the requestor (e.g., content item exchange 108 or a publisher) that no content item will be sent to the requestor in response to the request.

In step 212, the request filtration system 102 determines that the selected filter does not apply and determines whether the order configuration specifies that a downstream service executes after the selected filter. For example, the order configuration may indicate that a membership resolution service should be called after applying the selected filter.

In step 214, if the downstream filter is specified, then the downstream service is called. The membership resolution service may analyze information included in the selected request to determine whether the selected request originated from an entity with a membership profile. After the downstream service is called and returns a response, the request filtration system 102 returns to step 208. In the embodiment where the downstream service is a membership resolution service, the response may include any type of information stored with a user's profile, such as demographic information, browsing history, anonymized profile data, connections made by the user to other entities, and many other types of information. If the entity is not a member, then the response may indicate such and no content item is identified (or at least returned) in response to the request.

In step 216, if the downstream service is not specified, then the request filtration system 102 determines whether there are additional filters to be applied to the selected request. If there are additional filters, then the request filtration system 102 returns to step 208. If there are no additional filters, then, in step 218, the request filtration system 102 allows the request to proceed, including processing information gathered from the downstream service. For example, the content item generation system 104 receives the request and selects one or more content items based on the request.

4.0 Example of Applying Filters in a Request Filtration System

The following presents an example of how a request filtration system 102 operates in a request processing system 100. The example is merely intended to illustrate an example of how requests may be processed by the request filtration system 102, but the filters and services as described in the example below are not intended to be an exclusive example of how requests may be filtered in the request filtration system 102.

Phase 1. Content item exchange. A content item exchange external to the request processing system 100 transmits one or more requests. There may be more than one external content item exchange that transmits requests to the request processing system 100 at a given time. The data within the requests may be formatted in an exchange-specific format. For example, although the amount of information in each request from different content item exchanges may be the same, the information may be ordered differently, expressed in a different way, or different levels of specificity of information provided in each request.

Phase 2. Internal content item exchange. The internal content item exchange consolidates requests from the content item exchanges of phase 1. The internal content item exchange may also apply throttling to the number of requests of each content item exchange. For example, a load test may be performed on the request processing system 100. The load test will include information on how many QPS the request processing system 100 may handle at a given time. The QPS may be allocated to the content item exchanges, so that if a particular content item exchange exceeds the allocation to the content item exchange, further requests from the particular content item exchange are dropped or ignored. However, if the request filtration system 102 determines that the maximum load of the request filtration system 102 has not been met (e.g., if one or more other content item exchanges have not used their allocation), then requests from the particular content item exchange may be allowed to proceed. This may help to ensure that the request filtration system 102 may satisfy minimum service requirements for each content item exchange, but allow the flexibility for certain content item exchanges to exceed their allotment based on the current load of request filtration system 102.

Phase 3. Supply adapter. Requests from the content item exchange may not be in a universal request format used by the request filtration system 102. In order to process the requests, the supply adapter converts requests to a format expected by the request filtration system 102. This may include ordering information from requests in a particular order, so that the information or attributes may be properly indexed when determining whether a filter applies. For example, components of the request filtration system 102 may know, before a specific request is received, where in the specific request different pieces of information are found and how to interpret that information to evaluate whether a filter applies.

Phase 4. Global content item exchange filter. Global content item exchange filter(s) are applied to the requests. If a request satisfies attributes defined by a global content item exchange filter, then the request does not proceed to the remaining phases.

Phase 5. Content item exchange-specific filter. Content item exchange-specific filter(s) are applied to the requests. If a request satisfies attributes defined by an exchange based content item exchange-specific filter, then the request does not proceed to the remaining phases.

Phase 6. Membership resolution service. Each request is associated with an entity that makes the request. The membership resolution service is used to determine, based on information provided with the request, whether the entity that made the request is a member of a social network. Some examples of social networks include LinkedIn™, Facebook™, Google+™ and many others. If the entity is a member of the social network, then information on the entity included with their membership may be included to match content items.

Phase 7. Global content provider filter. Global content provider filter(s) are applied to the requests. If a request satisfies attributes defined by a global content provider filter, then the request does not proceed to the remaining phases.

Phase 8. Content item provider-specific filter. Content provider based content provider-specific filter(s) are applied to the requests. If a request satisfies attributes defined by a content provider based content provider-specific filter, then the request does not proceed to the remaining phases.

Phase 9. Content item selection. One or more content items are selected for any remaining requests.

5.0 Example Embodiment of a Request Filtration System

In an embodiment, the request filtration system 102 includes code executing on one or more computer systems. The computer system includes a data store including media items that may be used to generate one or more content items. The request filtration system 102 includes instructions for receiving requests from content item requesters, which may be users or other computing devices that request content items to be presented. The request filtration system 102 includes instructions to retrieve a set of filters and an order configuration specifying an order to apply the set of filters. For example, there may be different types of filters, such as global exchange filters, global provider filters, exchange-specific filter, or provider-specific filters. Each type of filter may include one or more filters to apply to the requests. Different embodiments of the request filtration system 102 may include filters of any number of filters of the different types of filters and may even include no filter of a specific filter type. The filters are applied to the requests in the order specified by the order configuration. Different embodiments of the request filtration system 102 may include one or more order configurations, where the selected order configuration depends on different factors. In an embodiment, the request filtration system 102 depends on exchange-specific and content provider-specific factors. For exchange-specific filters, a selection of filters and the order to apply the selected filters are determined based upon the exchange from which the request is received. For example, if a particular exchange sends a request to the request processing system 100, then the particular exchange's set of filters and order configuration are used. For content provider-specific filters, a selection of filters and the order to apply the selected filters are determined by a content provider. For example, if a particular content provider is selected to possibly satisfy a request, then the particular content provider's set of filters and order configuration are used.

The request filtration system 102 includes instructions to apply, to each request, a subset of the set of filters based on the order. For example, the subset may include one or more filters, depending on the order configuration. Some of the filters specified in the order configuration may include filters applied before a downstream service and filters applied after the downstream service. For example, a membership resolution service may be a downstream service. The request filtration system 102 sends information on requests that do not satisfy any filters of the subset of filters to the membership resolution service. If the response indicates that an entity is associated with each request is a member of an online service, then information on the user is returned. If the request is not associated with a member, then the request does not need to be further processed by the request filtration system 102.

In an embodiment, the request filtration system 102 includes instructions to determine, based on a content item exchange where the requests originated, at least one filter to include in the subset of filters and an exchange-specific order to apply the at least one filter. This may occur before or after the requests are considered by the membership resolution service.

In an embodiment, the request filtration system 102 includes instructions to determine, based on a content item provider, at least one filter to apply to the requests and a content item provider-specific order to apply the at least one filter. For example, there may be more than one content item provider that provides content items to be selected in response to requests for content items at the request filtration system 102. The configuration order may specify one or more filters to apply to requests and an order to apply the filters based on different content item provider requirements. For example, a content item provider may not be able to provide information in response to requests for native content items. Requests for native content items are then removed from consideration for the content item provider. The content item provider-specific filters may be considered after the membership resolution service. For example, a particular content provider's specific filters may be applied to a request after a content delivery campaign associated with the particular content provider has been selected to possibly respond to the request.

In an embodiment, the request filtration system 102 includes instructions to determine, based on the requests, how many requests the request processing system 100 may process at a given time. This is known as a throughput for the request processing system 100 measured over a given period of time. For example, the request filtration system 102 may determine how many requests it can handle based on how long it takes from when a request is received to when (1) a filter of the set of filters is satisfied or (2) a content item is sent in response to the request. This may be used to identify what types of requests the request filtration system 102 has difficulties in removing, so that the filters or filter order configuration may be optimized. For example, the request filtration system 102 may be used to determine the effectiveness of a new selection of a set of filters, a new selection of order configuration, or a new selection of both as compared to an existing selection of a set of filters and order configuration. A report may be generated based on how many requests satisfy each filter.

In an embodiment, different experiments may be executed to determine a baseline measurement to compare different scenarios. For example, the request processing system 100 may use (1) some selected filters, (2) none of the selected filters, or (3) filters ordered differently when determining a baseline measurement. The baseline measurement may assist an administrator in determining whether a filter is useful or not (e.g., whether the new scenario reduces or increases the throughput of the request processing system 100) as well as perform experiments to understand the effectiveness of different scenarios.

6.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
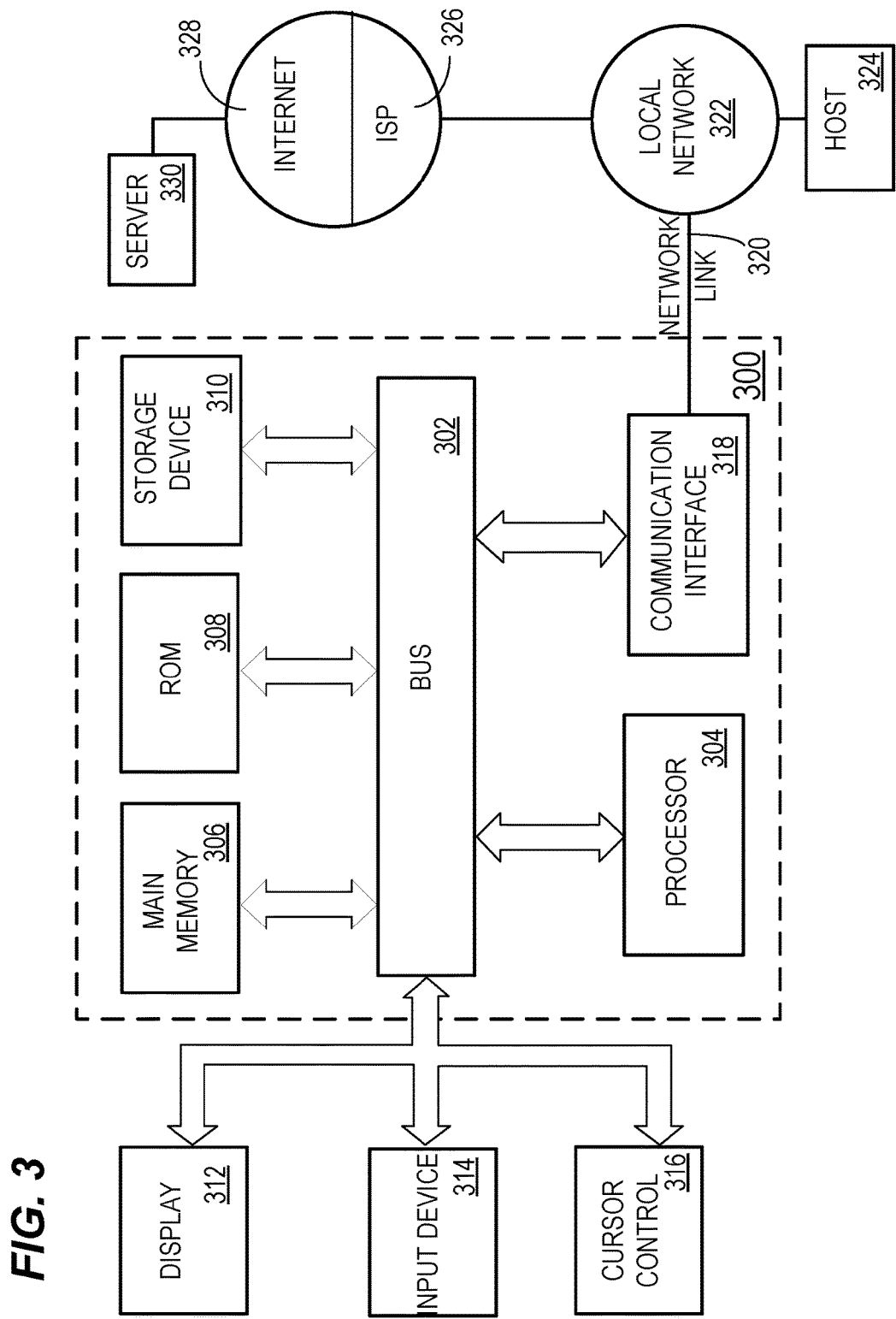
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (for example, x) and a second axis (for example, y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A system comprising:
one or more processors;
one or more data stores including information on one or more content items;
one or more storage media storing instructions which, when executed by the one or more processors, cause:

receiving a first plurality of requests from one or more content item requesters;
for each request in the first plurality of requests:
identifying, based on data associated with said each request, from among a plurality of filter configurations, a particular filter configuration that indicates a set of filters and an order to apply the set of filters;
applying, to said each request, a subset of the set of filters based on an order configuration;
removing said each request from the first plurality of requests to create a second plurality of requests if said each request satisfies a filter in the subset of the set of filters;
sending, to a downstream service, data associated with said each request only if said each request did not satisfy any filter in the subset of filters, wherein the downstream service determines whether an entity associated with said each request is a member of a social network service;
for a first request in the first plurality of requests:
identifying a first content item exchange that sent the first request;
based on the first content item exchange, identifying a first plurality of filters to apply to the first request;
for a second request in the first plurality of requests:
identifying a second content item exchange that is different than the first content item exchange and that sent the second request;
based on the second content item exchange, identifying a second plurality of filters, that is different than the first plurality of filters, to apply to the second request.

2. The system of claim 1, wherein the instructions, when executed by the one or more processors, further cause:
for each request of the second plurality of requests whose data is sent to the downstream service:
receiving a response from the downstream service;
if the response indicates that an entity associated with said each request is a member of the social network service, then:
identifying a plurality of content items that satisfy said each request;
selecting a content item from among the plurality of content items;
causing the content item to be sent to a content item requester from which said each request was received.

3. The system of claim 2, wherein the second plurality of filters includes a filter that is not included in the first plurality of filters or has a different ordering of filters than the first plurality of filters.

4. The system of claim 1, wherein the instructions, when executed by the one or more processors, further cause:
identifying a first type of content item that may be used to respond to a first request of the first plurality of requests;
based on the first type of content item, identifying a first plurality of filters to apply to the first request;
identifying a second type of content item that is different than the first type of content item and that may be used to response to a second request of the first plurality of requests;
based on the second type of content item, identifying a second plurality of filters, that is different than the first plurality of filters, to apply to the second request.

5. The system of claim 4, wherein the first type of content item comprises one of a video item, a text item, or a graphical item and the second type of content item comprises another one of a video item, a text item, or a graphical item.

6. The system of claim 1, wherein the instructions, when executed by the one or more processors, further cause:
after sending the data to the downstream service and before identifying the plurality of content items, applying a filter to each request of the second plurality of requests that are associated with a member of the social network service;
removing said each request from the second plurality of requests to create a third plurality of requests if said each request satisfied a filter in the subset of the set of filters.

7. The system of claim 1, wherein the instructions, when executed by the one or more processors, further cause:
determining a throughput measurement for a given time period, based on the first plurality of requests.

8. The system of claim 1, wherein the instructions, when executed by the one or more processors, further cause:
for each filter in the set of filters, determining a number of requests of the first plurality of requests that satisfies said each filter;
causing to be displayed information on each filter in the set of filters including the number of requests that satisfies said each filter.

9. The system of claim 1, wherein the instructions, when executed by the one or more processors, further cause:
reformatting the first plurality of requests from a first exchange format, used by an exchange where a subset of the first plurality of requests originated, to a filter format used to evaluate whether the set of filters have been satisfied.

10. The system of claim 1, wherein at least one request of the first plurality of requests satisfies a first filter and a second filter and the instructions, when executed by the one or more processors, further cause:
applying the first filter to a first request of the first plurality of requests;
determining that the first request satisfies the first filter;
determining to not apply the second filter to the first request.

11. The system of claim 1, wherein applying at least one filter of the set of filters involves determining whether a request originates from a mobile device or a non-mobile device.

12. The system of claim 1, wherein if the response indicates that an entity that is associated with said each request is not a member of the social network service, then determining to not proceed with selecting a content item in response to said each request.

13. The system of claim 1, wherein the order configuration is specified in a configuration file that is separate from one or more files specifying the set of filters.

14. The system of claim 1, wherein the downstream service further comprises a fraud detection service.

15. A method comprising:
receiving a first plurality of requests from one or more content item requesters;
retrieving a plurality of filters and an order configuration specifying an order to apply the plurality of filters for each request of the first plurality of requests,
wherein applying each filter of the plurality of filters includes making a determination on whether to proceed with a subsequent filter determined by the order;

for each request in the first plurality of requests:
   applying, to said each request, a subset of the plurality of filters based on the order;
   removing said each request from the first plurality of requests to create a second plurality of requests if said each request satisfied a filter in the subset of the plurality of filters;
   sending, to a membership resolution service, data associated with said each request only if said each request did not satisfy any filter in the subset of filters, wherein the membership resolution service determines whether an entity associated with said each request is a member of a social network service;
for each request of the second plurality of requests whose data is sent to the membership resolution service:
   receiving a response from the membership resolution service;
   if the response indicates that an entity is associated with said each request is a member of the social network service, then:
     identifying a plurality of content items that satisfy said each request;
     selecting a content item from among the plurality of content items;
     causing the content item to be sent to a content item requester from which said each request was received.

16. The method of claim 15, further comprising:
identifying a first content item exchange that sent a first request;
based on the first content item exchange, identifying a first plurality of filters to apply to the first request;
identifying a second content item exchange that is different than the first content item exchange and that sent a second request;
based on the second content item exchange, identifying a second plurality of filters, that is different than the first plurality of filters, to apply to the second request.

17. The method of claim 16, wherein the second plurality of filters includes a filter that is not included in the first plurality of filters or has a different ordering of filters than the first plurality of filters.

18. A system comprising:
one or more processors;
one or more data stores including information on one or more content items;
one or more storage media storing instructions which, when executed by the one or more processors, cause:
   receiving a first plurality of requests from one or more content item requesters;
   for each request in the first plurality of requests:
     retrieving from an initial configuration file, based on data associated with said each request and from among a plurality of filter configurations, a particular filter configuration that indicates a plurality of filters and an order configuration to apply the plurality of filters;
     applying, to said each request, a subset of the plurality of filters based on the order configuration;
     removing said each request from the first plurality of requests to create a second plurality of requests if said each request satisfies a filter in the subset of the plurality of filters;
     sending, to a downstream service, data associated with said each request only if said each request did not satisfy any filter in the subset of filters, wherein the downstream service determines whether an entity associated with said each request is a member of a social network service;
   for each request of the second plurality of requests whose data is sent to the downstream service:
     receiving a response from the downstream service;
     if the response indicates that an entity is associated with said each request is a member of the social network service, then:
       identifying a plurality of content items that satisfy said each request;
       selecting a content item from among the plurality of content items;
       causing the content item to be sent to a content item requester from which said each request was received.

19. The system of claim 18, wherein the instructions, when executed by the one or more processors, further cause:
before all requests of the first plurality of requests have been received, updating the initial configuration file to modify the plurality of filters or the order configuration to apply the plurality of filters;
for a first request of the plurality of requests, retrieving from the initial configuration file a first filter configuration that indicates a first plurality of filters and a first order configuration to apply the first plurality of filters;
for a second request of the plurality of requests, retrieving from the updated configuration file a second filter configuration that indicates a second plurality of filters and a second order configuration to apply the second plurality of filters.

20. The system of claim 19, wherein updating from the initial configuration file to the updated configuration file comprises uninterrupted processing of the first plurality of requests by the system.

\* \* \* \* \*